US011288018B2

(12) United States Patent
Potluri et al.

(10) Patent No.: US 11,288,018 B2
(45) Date of Patent: Mar. 29, 2022

(54) METHOD AND SYSTEM FOR DEPLOYING A VIRTUAL DISTRIBUTED UNIT ON A NETWORK DEVICE

(71) Applicant: Verizon Patent and Licensing Inc., Arlington, VA (US)

(72) Inventors: Ravi Potluri, Coppell, TX (US); Hans Raj Nahata, New Providence, NJ (US); Abdul Subhan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/829,723

(22) Filed: Mar. 25, 2020

(65) Prior Publication Data

US 2021/0303168 A1 Sep. 30, 2021

(51) Int. Cl.
| | | |
|---|---|---|
| *G06F 15/16* | (2006.01) | |
| *G06F 9/54* | (2006.01) | |
| *H04L 29/06* | (2006.01) | |
| *G06F 3/06* | (2006.01) | |
| *G06F 9/455* | (2018.01) | |
| *H04L 67/1097* | (2022.01) | |

(52) U.S. Cl.
CPC ............ *G06F 3/067* (2013.01); *G06F 3/0665* (2013.01); *G06F 9/45558* (2013.01); *H04L 67/1097* (2013.01); *G06F 2009/45595* (2013.01)

(58) Field of Classification Search
CPC .... G06F 3/067; G06F 9/45558; G06F 3/0665; H04L 67/1097
USPC ......................................................... 709/226
See application file for complete search history.

(56) References Cited

U.S. PATENT DOCUMENTS

| | | | | |
|---|---|---|---|---|
| 9,386,001 | B1 * | 7/2016 | Marquardt | ............... H04L 12/66 |
| 10,042,662 | B1 * | 8/2018 | Marquardt | ............... G06F 21/53 |
| 10,671,439 | B1 * | 6/2020 | Frandzel | .................. G06F 3/067 |
| 10,791,507 | B1 * | 9/2020 | Mukherjee | ............ H04W 4/029 |
| 10,797,968 | B2 * | 10/2020 | Suthar | ................. H04L 41/5054 |
| 10,862,760 | B2 * | 12/2020 | Caldwell | ............. G06F 9/45558 |
| 2016/0344507 | A1 * | 11/2016 | Marquardt | .......... H04J 14/0227 |
| 2016/0373474 | A1 * | 12/2016 | Sood | ........................ G06F 21/50 |
| 2017/0063714 | A1 * | 3/2017 | Xiang | ................. H04L 41/5058 |
| 2017/0199752 | A1 * | 7/2017 | Cao | ...................... G06F 9/45558 |
| 2017/0339247 | A1 * | 11/2017 | Tiwari | ................ H04L 41/0806 |

(Continued)

OTHER PUBLICATIONS

A. Sgambelluri et al., "Provisioning RAN as a Service (RANaaS) Connectivity in an Optical Metro Network Through NETCONF and YANG," 2018 European Conference on Optical Communication (ECOC), Rome, Italy, 2018, pp. 1-3, doi: 10.1109/ECOC.2018. 8535114. (Year: 208).*

(Continued)

*Primary Examiner* — Hamza N Algibhah

(57) ABSTRACT

A device may obtain network information associated with a network device to be installed at a particular location in a network. The device may select, based on the network information, a virtual distributed unit (vDU), of a plurality of vDUs, to be deployed on the network device. The device may generate, based on selecting the vDU, deployment information associated with the vDU, where the deployment information includes configuration information that is configured for the particular location. The device may send the deployment information to the network device to cause the vDU to be automatically deployed on the network device.

20 Claims, 10 Drawing Sheets

(56) References Cited

U.S. PATENT DOCUMENTS

| | | | |
|---|---|---|---|
| 2018/0011730 A1* | 1/2018 | Zembutsu | G06F 11/20 |
| 2018/0018193 A1* | 1/2018 | Yabushita | G06F 11/20 |
| 2018/0026992 A1* | 1/2018 | Paczkowski | G06F 9/45558 |
| | | | 726/4 |
| 2018/0081702 A1* | 3/2018 | Cohen | G06F 8/36 |
| 2019/0052549 A1* | 2/2019 | Duggal | G06Q 30/04 |
| 2019/0121960 A1* | 4/2019 | Brown | G06F 9/5077 |
| 2019/0166630 A1* | 5/2019 | Sivakumar | H04W 4/029 |
| 2019/0253264 A1* | 8/2019 | Singaravelu | H04L 9/3263 |
| 2019/0394658 A1* | 12/2019 | Baillargeon | H04W 56/001 |
| 2020/0067782 A1* | 2/2020 | Yousaf | H04L 41/0896 |
| 2020/0162348 A1* | 5/2020 | Suthar | H04W 24/02 |
| 2020/0186442 A1* | 6/2020 | Nazarzadeoghaz | |
| | | | H04L 41/5045 |
| 2020/0221299 A1* | 7/2020 | Suthar | H04W 12/041 |
| 2020/0272859 A1* | 8/2020 | Iashyn | G06K 9/6262 |
| 2020/0274852 A1* | 8/2020 | Ahmed | H04L 63/0263 |
| 2020/0412596 A1* | 12/2020 | Cherunni | H04L 41/04 |

OTHER PUBLICATIONS

ETSI, "Multi-access Edge Computing (MEC); Phase 2: Use Cases and Requirements", Oct. 2018, 66 pages.

* cited by examiner

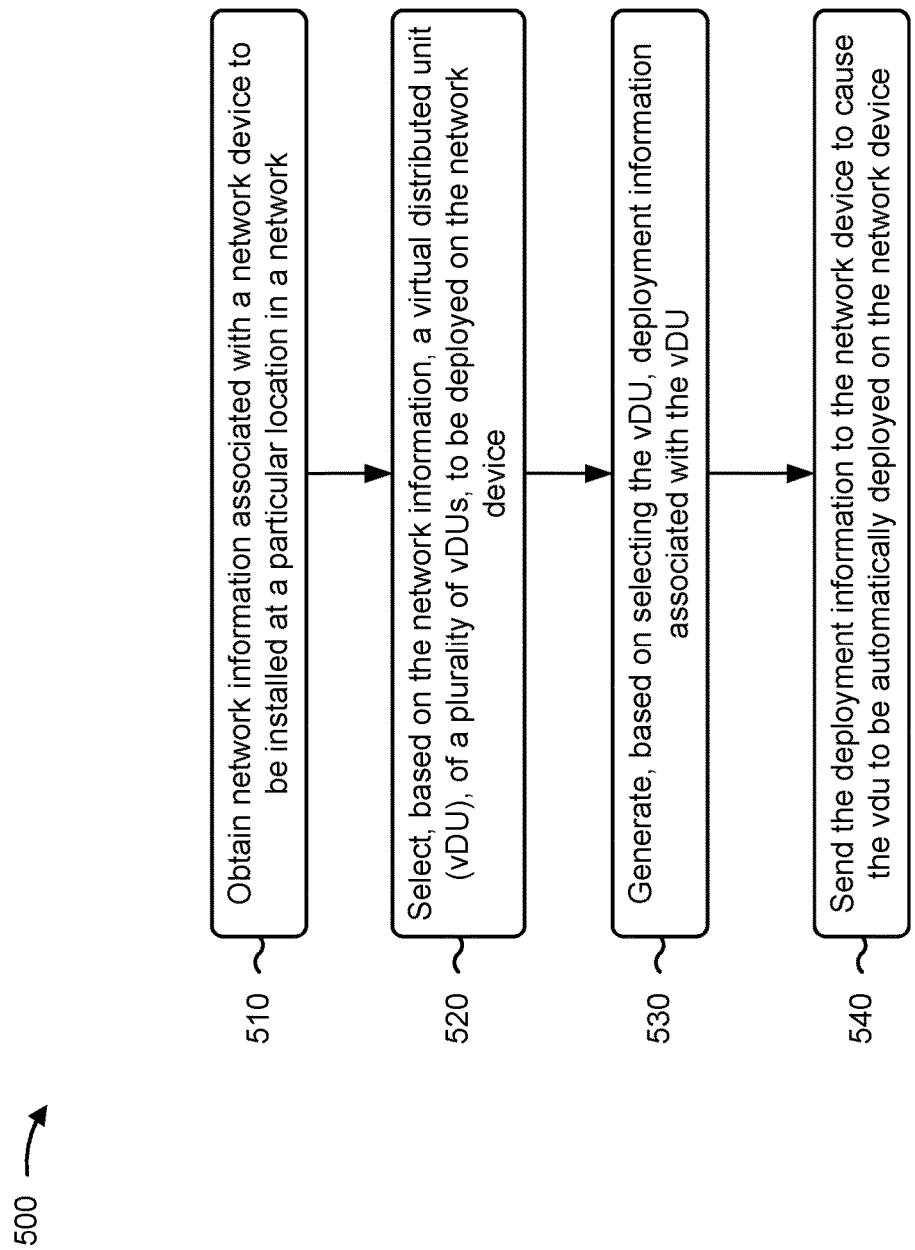

METHOD AND SYSTEM FOR DEPLOYING A VIRTUAL DISTRIBUTED UNIT ON A NETWORK DEVICE

BACKGROUND

Virtual distributed units (vDUs) and virtual radio access networks (VRANs) comprise the deployment and connection of services that are deployed and removed from dedicated networks as needed. Traditionally, design and deployment of vDUs and VRANs is a time consuming and resource intensive process.

BRIEF DESCRIPTION OF THE DRAWINGS

FIG. 5 is a flow chart of an example process for automatically deploying a virtual distributed unit on a network device.

DETAILED DESCRIPTION OF PREFERRED EMBODIMENTS

The following detailed description of example implementations refers to the accompanying drawings. The same reference numbers in different drawings may identify the same or similar elements.

A virtual radio access network (vRAN) is a term that encompasses the deployment and connection of services that are removed from dedicated physical devices and moved to virtualized methods, such as virtual machines, containers, and/or the like. Virtualization of radio access networks offers several benefits because of the flexibility offered by virtualizing hardware. Previously inflexible, vendor-specific hardware may be moved to virtual systems that are flexible as a result of not having to rely on specific hardware structures. In addition, virtualization offers more efficient, effective systems since upgrades may be applied through software distribution methods that may be applied remotely, instead of needing to equip each individual hardware with new software.

A user may install a new network device at or near a base station. The network device may be used for a virtualized network function, such as to host a virtual distributed unit (vDU). However, the installation of a vDU may be complex and require specialized knowledge to be properly executed. Improper deployment of the vDU may be common due to the complexity. As a result, computing resources (e.g., processor resources, memory resources, communication resources, and/or the like) may be wasted by a user attempting to identify, diagnose, and/or remedy errors due to incorrect deployment of the vDU.

According to some implementations described herein, an orchestrator platform may obtain information about a network device and determine the right deployment information needed to deploy a vDU to be hosted on the network device. Based on this, the orchestration platform may send the deployment information to the network device to cause the network device to deploy the vDU. In this way, the process of deploying a vDU is automatic, reducing a likelihood of incorrect deployment of the vDU. Processes previously used to determine deployment information for the vDU now undergoes a rigorous procedure to automatically determine the correct deployment information for the vDU. In turn, this improves an overall success rate of deploying vDUs by reducing the quantity of incorrect deployment attempts. This saves computing resources (e.g., processor resources, memory resources, communication resources, and/or the like) and reduces time to upgrade and install vDUs identify, diagnose, and/or remedy errors due to incorrect deployment of vDUs. In addition, this improves the performance of the network device and the network as a whole, since incorrect deployments do not interfere with the performance of the network device and the network, thereby saving computing resources that would have otherwise been used to fix errors identified with the performance of the network device and the network as a whole.

Figure 1A:
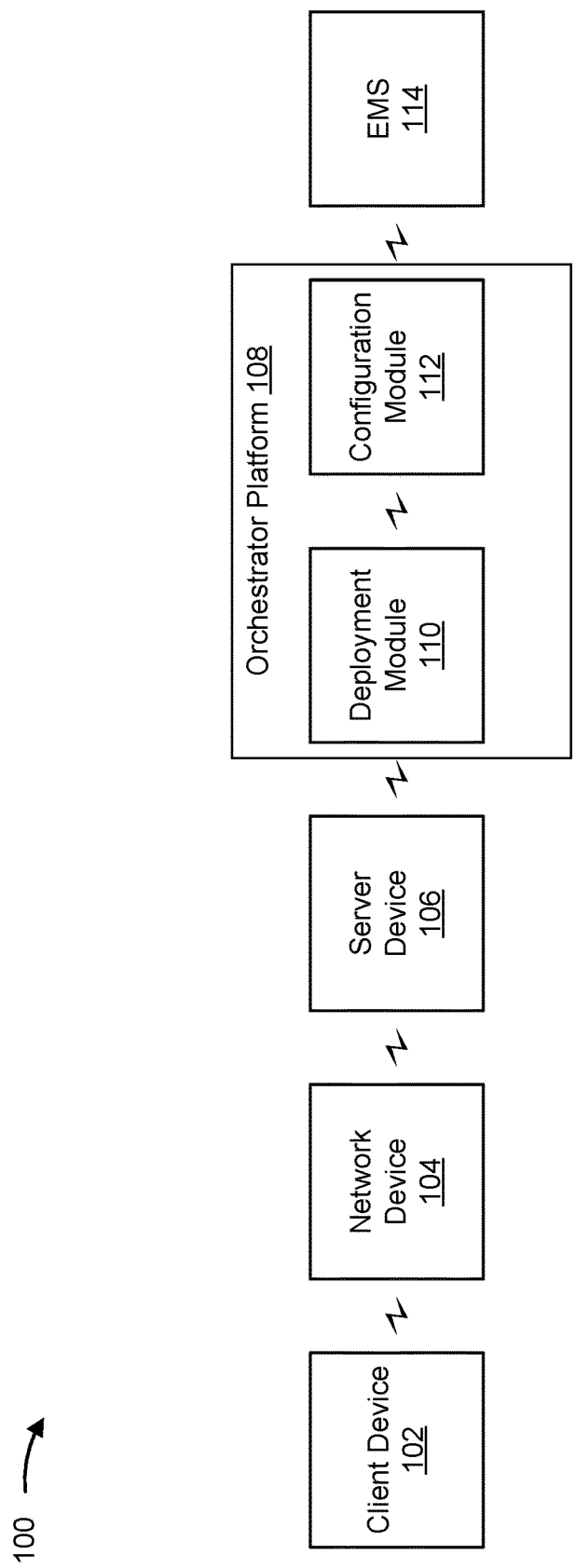
FIGS. 1A-1F are diagrams of one or more example implementations described herein.

FIGS. 1A-1F are diagrams of one or more example implementations 100 described herein. As shown in FIG. 1A, some implementations described herein may include a client device 102, a network device 104, a server device 106, an orchestrator platform 108 with a deployment module 110 and a configuration module 112, and an element management system (EMS) 114. The network device 104 may be a node (e.g., a base station) in a radio access network (RAN) to be installed as part of the RAN. The client device 102 may be used to install the network device 104 as part of a virtual radio access network (vRAN). The client device 102 may interact with one or more other devices, such as the network device 104, the server device 106, the orchestrator platform 108, and/or the EMS 114, to complete the installation of the network device 104. The orchestrator platform 108 may be used to determine various information to assist with deploying a virtual distributed unit (vDU) on the network device 104. The orchestrator platform 108 may have the deployment module 110 that determines deployment information associated with a vDU and the configuration module 112 that determines configuration information associated with the vDU. Further details regarding client device 102, network device 104, server device 106, orchestrator platform 108, and EMS 114 will be provided below in connection with FIGS. 1B-1F.

Figure 1B:
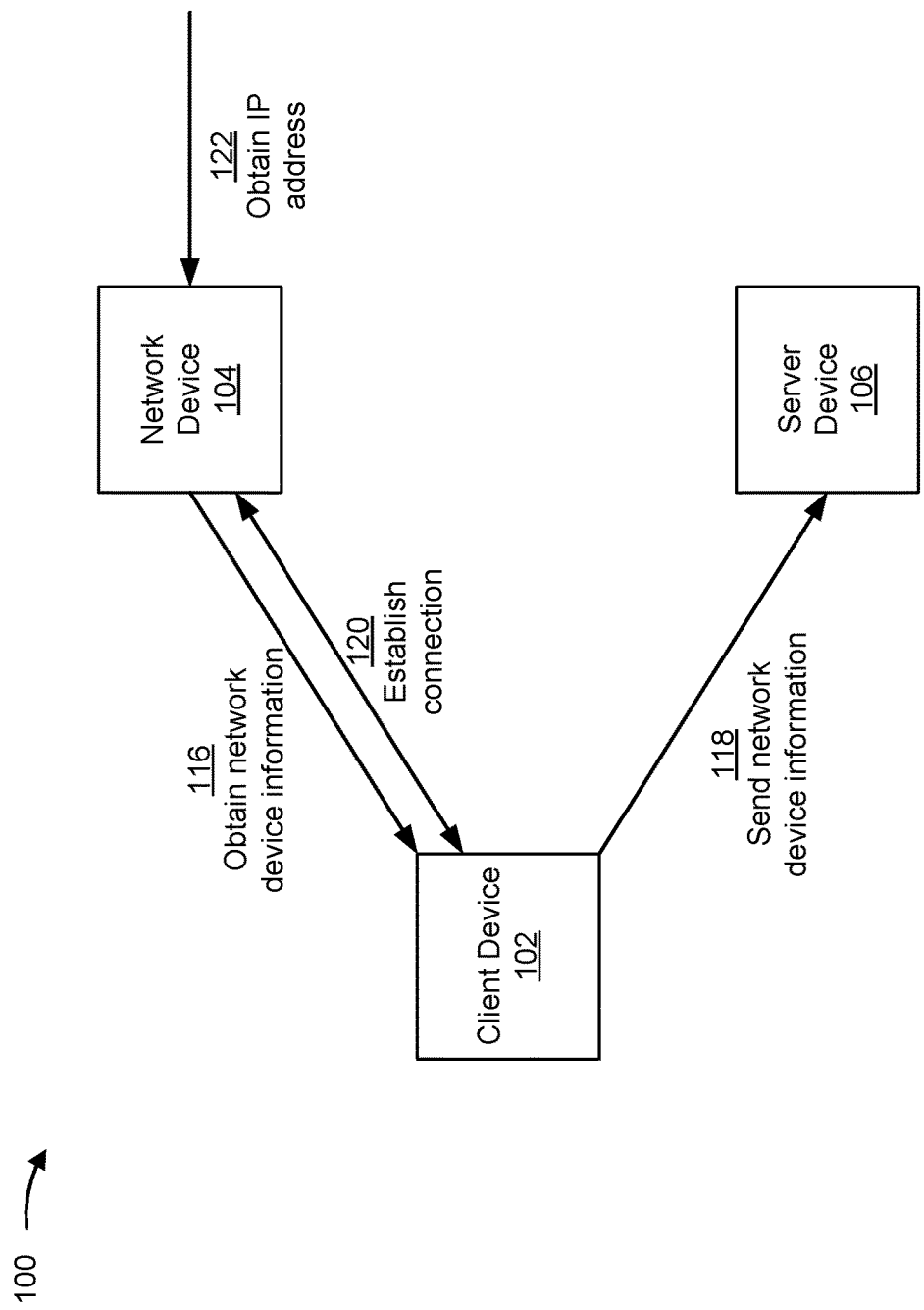

As shown in FIG. 1B, and by reference number 116, the client device 102 may obtain network device information from the network device 104. For example, a user may use the client device 102 to interact with the network device 104 that is powered off, disconnected from a network, and/or the like. The user may use the client device 102 to obtain information from the network device 104 to obtain the proper information to get network device 104 powered on, connected to the network, and/or the like. For example, the user may use client device 102 may obtain the network device information from the network device 104 by scanning a barcode or label on the network device 104, obtaining a serial number from the network device 104, and/or the like. In some implementations, the network device 104 may be powered on and communicate with the client device 102 for the client device 102 to obtain the network device information.

The network device information may include various information associated with the network device 104 (e.g., which base station the network device 104 is to be associated with, what other network devices the network device 104 is to be associated with, and/or the like). In some implementations, the network device information may include information related to an installation location (e.g., information indicating a particular location in the network at which the network device 104 is to be installed, information indicating a geographic location of the network device 104, information indicating the location of the network device 104 in relation to one or more other network devices, and/or the like). In some implementations, the network device information may include information associated with characteristics of the network device 104 (e.g., information indicating one or more characteristics of the network device 104, information indicating one more characteristics of a cluster of network devices that includes the network device 104, and/or the like). For example, the network device information may include information indicating a market associated with the network device 104, information identifying a vendor associated with the manufacturing, selling, or maintaining the network device 104, and/or the like. In some implementations, the network device information may include information about a purpose of the network device 104 (e.g., information indicating a project associated with installing the network device 104, information indicating a project associated with maintaining the network device 104, and/or the like). While various types of network device information have been identified above, in practices, the network device information may include any one or more of the types of network device information identified above and/or one or more other types of network device information.

As further shown in FIG. 1B, and by reference number 118, the client device 102 may send the network device information to the server device 106. The server device 106 may store the network device information to be sent to one or more other devices as part of the installation process. For example, the server device 106 may send the network device information to the orchestrator platform 108 so the orchestrator platform 108 may determine relevant installation information for the network device 104. The server device 106 may store the network device information in a data structure (e.g., a database, a table, a list, and/or the like). In some implementations, the server device 106 may verify that the network device 104 is to be installed based on receiving the network device information. This may enable the client device 102 to connect with the network device 104 and continue the installation process.

As further shown in FIG. 1B, and by reference number 120, the client device 102 may establish a connection with the network device 104. In some implementations, the client device 102 may establish the connection with the network device 104 based on the client device 102 receiving an instruction, an authorization, and/or the like from the server device 106. The network device 104 may be caused to power up and establish a connection with a network (e.g., a RAN, a vRAN, and/or the like). In this way, the client device 102 may enable the network device 104 to communicate with other devices in the network, such as the server device 106, the orchestrator platform 108, and/or the like. The client device 102 may establish the connection with the network device 104 after the network device 104 powers up and/or establishes the connection with the network.

As further shown in FIG. 1B, and by reference number 122, the network device 104 may obtain an internet protocol (IP) address. The network device 104 may obtain the IP address based on establishing the connection with the client device 102. The network device 104 may communicate with another device (e.g., the server device 106, a cloud service router (CSR) dynamic host configuration protocol (DHCP) device, and/or the like) to authenticate the network device 104. The IP address may be sent to another device (e.g., the server device 106, the orchestrator platform 108, another network device, and/or the like) that may use the IP address for identifying the network device 104 in the network.

Figure 1C:
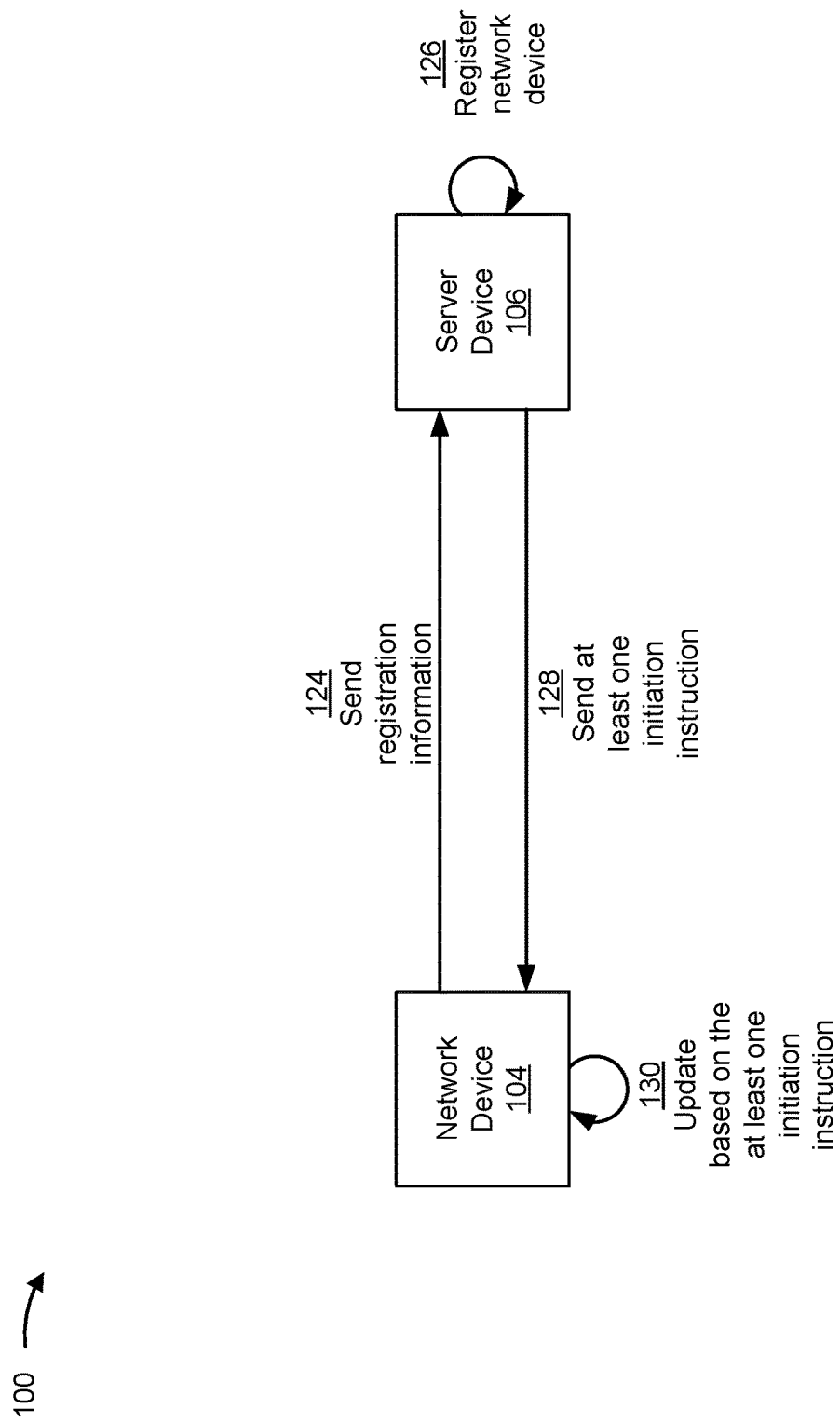

As shown in FIG. 1C, and by reference number 124, the network device 104 may send registration information to the server device 106. The registration information may be used by the server device 106 to determine particular installation information for the network device 104. For example, the registration information may include information indicating that the network device 104 is part of a cluster of network devices. Thus, the registration information may include information allowing the server device 106 to install the network device 104 as part of the cluster of network devices. Based on this, the server device 106 may determine particular installation information for the network device 104. In some implementations, the network device 104 may send the registration information to the server device 106 based on the network device 104 completing an initial stage of installation, after obtaining the IP address, based on an instruction from the client device 102, and/or the like.

As further shown in FIG. 1C, and by reference number 126, the server device 106 may register the network device 104. Registering the network device 104 may include preparing the network device 104 to be part of the network, preparing the network device 104 to be a member of the cluster of network devices, preparing the network device 104 to be used for virtualization (e.g., for a virtual machine, for a container, and/or the like), and/or the like. To register the network device 104, the server device 106 may determine installation information needed based on the registration information. The installation information may include software updates specific to a location (e.g., geographic location, network location, and/or the like), specific to the cluster of network devices, specific to the type of the network device 104, specific to a make and/or model of the network device 104, and/or the like.

As further shown in FIG. 1C, and by reference number 128, the server device 106 may send at least one initiation instruction to the network device 104. In this way, the server device 106 sends information that causes the network device 104 to be properly prepared for other steps in an installation process to ready the network device 104 as part of the network. For example, the at least one initiation instruction may cause the network device 104 to update software on the network device 104, firmware on the network device 104, and/or the like. The at least one initiation instruction may cause the network device 104 to obtain additional information (e.g., proper files, software, and/or the like) to prepare the network device 104 to be part of the network, to be a member of the cluster, to be used for virtualization, and/or the like. For example, the network device 104 may be caused to interact with another device (e.g., the client device 102, the server device 106, another server device, and/or the like) to obtain the additional information to complete the update.

As further shown in FIG. 1C, and by reference number 130, the network device 104 may update based on the at least one initiation instruction. By updating, the network device 104 may be properly prepared for additional steps in the installation process. The network device 104 may obtain information from an additional device (e.g., the client device 102, the server device 106, another server device, and/or the like) to complete the update. For example, the network device 104 may interact with the server device 106 to obtain necessary files or other information to complete the update. As part of the update, the network device 104 may reboot, communicate with another device (e.g., the client device 102, the server device 106, and/or the like), and/or the like.

Figure 1D:
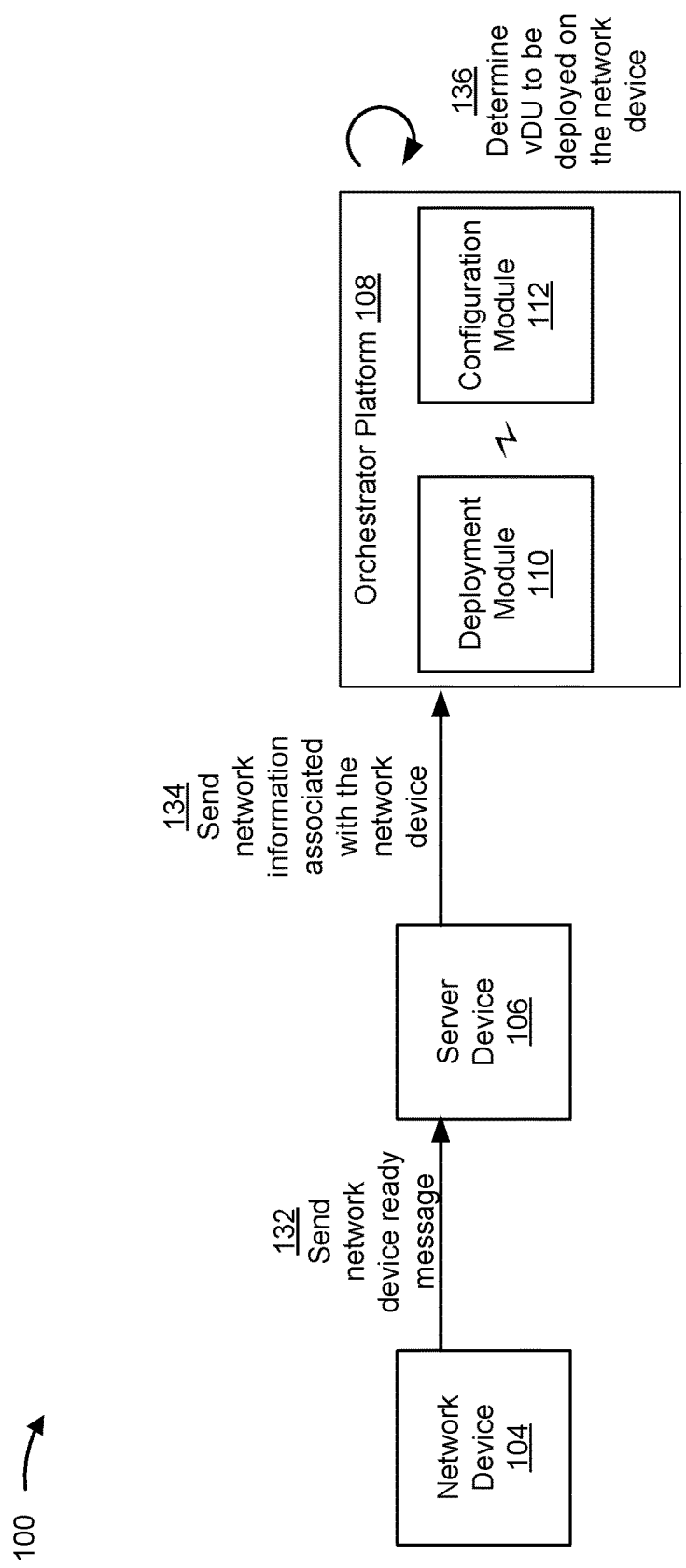

As shown in FIG. 1D, and by reference number 132, the network device 104 may send a network device ready message to the server device 106. The network device ready message may signify to the server device 106 that the network device 104 is prepared for additional steps in the installation process (e.g., for deployment of a vDU on the network device 104). For example, the network device ready message may indicate to the server device 106 that the network device 104 is set up to be part of the network, set up as a member of the cluster, set up to be used for virtualization, and/or the like. The network device 104 may send the network device ready message based on completing the update, based on receiving an instruction to send the network device ready message, and/or the like. As a result, the server device 106 may prepare information to deploy a vDU on the network device 104 based on information previously obtained from the network device 104. For example, the server device 106 may prepare information previously received (e.g., the network device information, the registration information, the IP address, and/or the like) to send to another device (e.g., the orchestrator platform 108).

As further shown in FIG. 1D, and by reference number 134, the server device 106 may send network information associated with the network device 104 to the orchestrator platform 108. The network information may be the information prepared by the server device 106 to send to the orchestrator platform 108 and include various information previously obtained by the server device 106, such as the network device information, the registration information, the IP address, and/or the like. Based on receiving the network information, the orchestrator platform 108 may determine deployment information to deploy a vDU, on the network device 104. Information to deploy a vDU is described in more detail below, and may include configuration information, deployment information, pre-deployment information, and/or the like. For example, the information to deploy the vDU may include any information necessary to deploy the vDU on the network device 104, such as information to configure resources on the network device 104 for deployment of the vDU.

As further shown in FIG. 1D, and by reference number 136, the orchestrator platform 108, using the configuration module 112, may determine a vDU to be deployed on the network device 104. The configuration module 112 may be a module of the orchestrator platform 108 that determines a vDU, along with configuration information associated with the vDU, to deploy on the network device 104. The configuration information, explained in more detail below, includes information associated with deploying the vDU, such as information indicating storage resources associated with the vDU, and/or the like. While the figures illustrate the configuration module 112 as being part of the orchestrator platform 108, the configuration module 112 may be a separate device from, or apart from, the orchestrator platform 108. In the case where the configuration module 112 is a separate device, the orchestrator platform 108 may communicate with the separate device to obtain information about the vDU.

The configuration module 112 may determine the vDU based on the network information obtained by the orchestrator platform 108. For example, the configuration module 112 may select a particular vDU, out of a plurality of VDUs, to be deployed on the network device 104 that meets hardware specifications of the network device 104, meets specifications required by a cluster of network devices of which the network device 104 is part, and/or the like. In some implementations, the configuration module 112 may search a database of information identifying vDUs for information identifying the particular vDU that is to be deployed on the network device 104, or otherwise select the vDU out of a plurality of vDUs.

In some implementations, the configuration module 112 may use machine learning, artificial intelligence, deep learning, and/or the like to select the particular vDU out of a plurality of vDUs. For example, the configuration module 112 may use a machine learning model to determine characteristics of the network information (e.g., the network device information, the registration information, the IP address, and/or the like) and characteristics of vDUs that may be useful in selecting a particular vDU, out of the plurality of vDUs, to be deployed on a network device.

In some implementations, the configuration module 112 may parse natural language descriptions of vDUs, network information, and/or the like to assist in selecting the particular vDU out of a plurality of vDUs. The configuration module 112 may determine a characteristic of a vDU, a piece of network information, and/or the like based on the natural language processing performed on the natural language descriptions of the vDUs, network information, and/or the like. In this way, the configuration module 112 may identify characteristics associated with the vDU and/or the network information that may assist in selecting a vDU, out of a plurality of vDUs, that corresponds to the network information.

In some implementations, the configuration module 112 may determine whether the obtained network information corresponds to other obtained network information that corresponds to a particular vDU. In this case, the configuration module 112 may generate and/or train a vDU selection module. The configuration module 112 may train the model using information that includes a plurality of characteristics of the network information, a plurality of characteristics of the vDUs, and/or the like to determine which characteristics of the network information and/or the vDU are most likely to indicate a corresponding match between the network information and a particular vDU. In some implementations, the configuration module 112 may determine that past characteristics of the network information are associated with a threshold probability of: being associated with a particular vDU, selecting a proper vDU, and/or the like. Additionally, or alternatively, the configuration module 112 may use a scoring system (e.g., with relatively high scores and relatively low scores) to identify and/or classify particular characteristics of network information as being associated with particular characteristics of a vDU.

In some implementations, the configuration module 112 may perform a data preprocessing operation when generating the vDU selection model. This may include preprocessing data to remove non-ASCII characters, white spaces, confidential data, and/or the like, allowing the configuration module 112 to organize thousands, millions, or billions of data items for machine learning and model generation.

Based on applying this rigorous and automated process, the configuration module 112 enables recognition and/or identification of potentially millions of characteristics for thousands or millions of network information and/or vDUs, thereby increasing an accuracy and consistency of selecting the particular vDU out of a plurality of vDUs relative to requiring computing resources to be allocated for hundreds or thousands of users to manually select the vDU out of a plurality of vDUs.

Figure 1E:
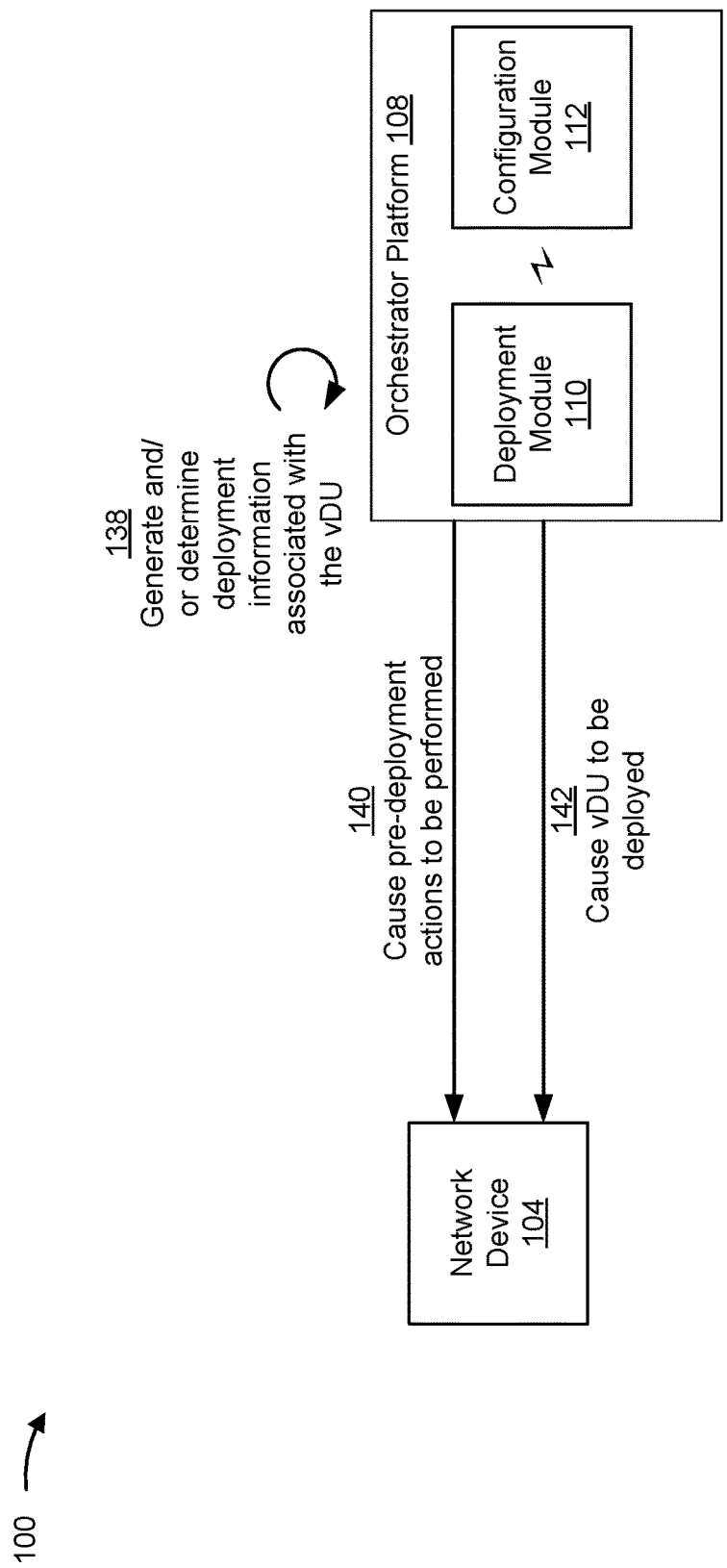

As shown in FIG. 1E, and by reference number 138, the orchestrator platform 108, using the deployment module 110 and/or the configuration module 112, may generate and/or determine deployment information associated with the vDU based on the configuration module 112 selecting the vDU. The deployment information may include general information that assists the network device 104 in deploying the particular vDU or deploying a vDU in general. For example, the deployment information may include information that causes the network device 104 to further update the network device 104 to assist with virtualization, information that causes the network device 104 to configure the network device 104 to assist with efficiency in deploying the vDU, and/or the like.

In some implementations, the deployment information may include configuration information. The configuration information may be determined by the configuration module 112 and may include various information associated with configuring the network device 104 such that a particular vDU may be successfully deployed on the network device 104. Whereas configuration information may include specific information associated with the configuration details of the vDU, deployment information may include information that causes the network device 104 to perform actions based on the configuration information. In some implementations, the configuration information may include information that is configured for a particular location (e.g., a particular network location, a particular cluster of network devices, a particular geographic location, and/or the like). For example, the configuration information, if configured for a network device that needs to communicate with three other network devices, may indicate which network device resources may be configured to allow the network device to communicate with the three other network devices. Additionally, or alternatively, the configuration information may include information indicating one or more location-specific parameters associated with the vDU. Location-specific parameters include parameters associated with a particular location (e.g., a geographic location, a network location, and/or the like). For example, the location-specific parameters may include information on which other network devices the vDU communicates with based on a geographic location or a network location.

In some implementations, the configuration information may include information associated with configuring resources of a device hosting the vDU. For example, the configuration information may include information indicating storage resources associated with the vDU, information indicating one or more namespaces associated with vDU, and/or the like. Additionally, or alternatively, the configuration information may include information indicating an address (e.g., a network address, a location address, and/or the like) associated with the vDU. In some implementations, the configuration information may include information identifying an EMS associated with the vDU (e.g., EMS 114). The EMS may be used to manage the network device 104, one or more devices associated with the network device 104, and/or the like.

Based on the deployment information associated with the vDU, the orchestrator platform 108, using deployment module 110, may generate one or more pre-deployment instructions associated with the vDU. The pre-deployment instructions may include various instructions to configure resources on the network device 104 to prepare the network device 104 for deployment of the vDU. A pre-deployment instruction may relate to one or more pre-deployment actions to be taken before the vDU is deployed, such as configuring the network device 104. For example, a pre-deployment instruction may include configuring one or more storage resources of the network device 104, configuring one or more processing resources of the network device 104, configuring one or more namespaces of the network device 104, configuring one or more interfaces of the network device 104, and/or the like. The one or more pre-deployment actions are provided as examples of pre-deployment actions that might be performed by the network device 104. In practice, the one or more pre-deployment actions may include any single pre-deployment action identified above, any combination of the pre-deployment actions identified above, or one or more other types of pre-deployment actions that may be performed by the network device 104 prior to deploying a vDU.

In some implementations, the orchestrator platform 108, using the deployment module 110, may generate and/or determine one or more post-deployment instructions associated with the vDU. A post-deployment instruction may allow the orchestrator platform 108 or another device to determine the functionality, efficiency, and/or the like of the vDU deployed on the network device 104. A post-deployment instruction associated with the vDU may cause the network device 104 to perform one or more particular actions after the deployment of the vDU. For example, the orchestrator platform 108 may cause the network device 104 to perform one or more particular actions that test the vDU. The orchestrator platform 108 may generate post-deployment health check data (e.g., information that tests the functionality of the vDU, information that checks the status of the vDU, and/or the like) and send the post-deployment health check data to the network device 104 to cause the vDU to be tested.

As further shown in FIG. 1E, and by reference number 140, the orchestrator platform 108, using deployment module 110 and/or configuration module 112, may cause pre-deployment actions to be performed on the network device 104. For example, the orchestrator platform 108 may cause the network device 104 to perform one or more pre-deployment actions to prepare for the vDU to be deployed on the network device 104. This may include any one or more of the pre-deployment actions described above in relation to FIG. 1E. For example, a pre-deployment action may include configuring one or more storage resources of the network device 104, configuring one or more processing resources of the network device 104, configuring one or more namespaces of the network device 104, configuring one or more interfaces of the network device 104, and/or the like.

As further shown in FIG. 1E, and by reference number 142, the orchestrator platform 108, using deployment module 110 and/or configuration module 112, may cause the vDU to be deployed on the network device 104. For example, the orchestrator platform 108 may send any necessary information or resources to the network device 104 to cause the vDU to be deployed on the network device 104. In some implementations, the network device 104 may obtain any necessary information or resources to cause the vDU to be deployed on the network device 104. For example, the network device 104 may communicate with the server device 106 to obtain any necessary resources to cause the vDU to be deployed on the network device 104.

In some implementations, the orchestrator platform 108 may generate and/or determine post-deployment instructions associated with the vDU, as mentioned above. The following figure, FIG. 1F, illustrates this scenario.

Figure 1F:
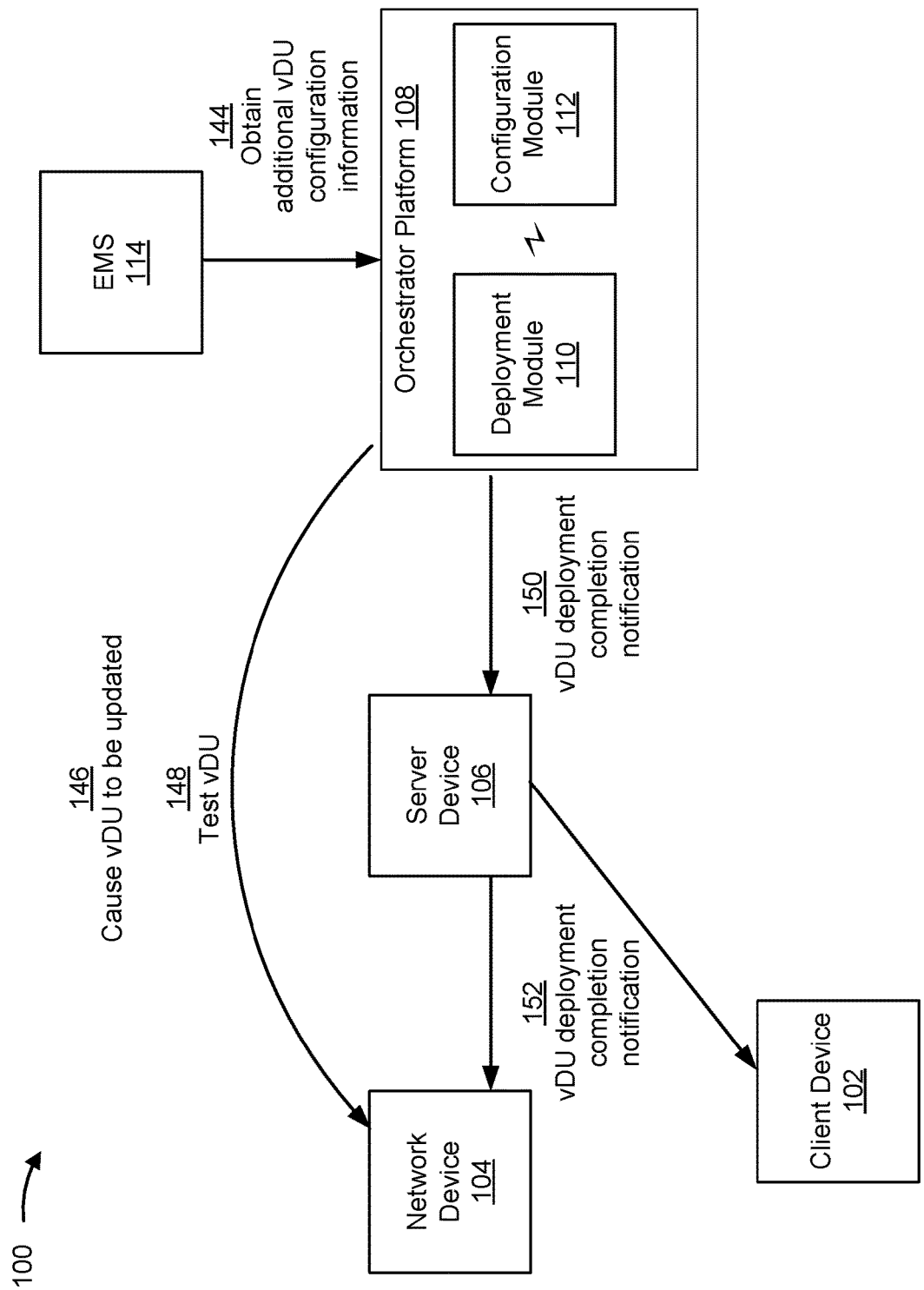

As shown in FIG. 1F, and by reference number 144, the orchestrator platform 108 may obtain additional vDU configuration information from the EMS 114. The EMS 114 may have updated vDU configuration information based on managing the functions and capabilities of the network device 104. The additional vDU configuration information may be used to further update the network device 104 to properly run the vDU, increase an efficiency of the vDU, and/or the like. The additional vDU configuration information may include similar information that was used to determine the vDU, the configuration information, and/or the like as described in relation to previous figures. For example, the additional vDU configuration information may include information that is configured for a particular location (e.g., a particular network device, a particular cluster of network devices, a particular geographic location, and/or the like). Additionally, or alternatively, the additional vDU configuration information may include information indicating one or more location-specific parameters associated with the vDU. In some implementations, the additional vDU configuration information may include information indicating storage resources associated with the vDU, information indicating one or more namespaces associated with vDU, and/or the like.

In some implementations, the orchestrator platform, using deployment module 110 and/or configuration module 112, may generate additional deployment information associated with the vDU based on obtaining the additional configuration information associated with the vDU. The additional deployment information may be used to cause the network device 104 to configure the network device 104 in accordance with the additional configuration information. The additional deployment information may be of a similar type to the deployment information previously determined by the orchestrator platform 108. The additional deployment information may be used to modify the original deployment information due to new and/or updated information regarding the vDU, the network device 104, the network, and/or the like. The orchestrator platform 108 may send the additional deployment information associated with the vDU to the network device 104 to cause the vDU, deployed on the network device 104, to be updated.

As further shown in FIG. 1F, and by reference number 146, the orchestrator platform 108 may cause the vDU to be updated. This may include sending information to the network device 104 that causes the network device 104 to be configured, such as by altering storage resources, namespaces, and/or the like. The orchestrator platform 108 may send information that causes the network device 104 to update, cause the network device 104 to obtain necessary information to cause the update, and/or the like.

As further shown in FIG. 1F, and by reference number 148, the orchestrator platform 108 may test the vDU. In this way, the orchestrator platform 108 may evaluate the functionality of the vDU. The orchestrator platform 108 may generate and/or determine particular tests that test a functionality of the vDU and send the particular tests to the network device 104 to cause the network device 104 to perform actions that execute the particular tests. In some implementations, the orchestrator platform 108 may cause the network device 104 to output data related to the functionality of the vDU.

Based on testing the vDU on the network device 104, the orchestrator platform 108 may determine that the vDU has been successfully deployed on the network device 104. This may be based on output from the testing of the vDU. For example, if the output of the vDU indicates that the functionality of the vDU meets a particular threshold, the orchestrator platform 108 may determine that the vDU has been successfully deployed.

As further shown in FIG. 1F, and by reference number 150, the orchestrator platform 108 may send a vDU deployment completion notification to the server device 106. This may indicate to the server device 106 that the network device 104 is properly set up as part of the network, that the vDU has been successfully deployed on the network device 104, and/or the like. This may prompt the server device 106 to conduct actions consistent with finalizing installation. For example, the server device 106 may open and/or close connections to particular devices (e.g., the client device 102, the network device 104, and/or the like) based on finalizing installation. In some implementations, the server device 106 may communicate with other devices to indicate that the vDU has been successfully deployed on the network device 104.

As further shown in FIG. 1F, and by reference number 152, the server device 106 may send the vDU deployment completion notification to the network device 104 and/or the client device 102. This may indicate to the network device 104 and/or the client device 102 that the network device 104 is properly set up as part of the network, that the vDU has been successfully deployed on the network device 104, and/or the like. Based on this, the network device 104 may determine to end installation activities. In some implementations, the client device 102 may provide a notification that the vDU has been successfully deployed, thereby indicating to a user of the client device 102 that installation activities may be completed.

In this way, the orchestrator platform 108 performs a rigorous and automated process for determining deployment information, as well as causing one or more devices to perform configuration and other actions based on the deployment information. This may improve the accuracy and efficiency of deploying vDUs by reducing the quantity of incorrect deployment attempts. Consequentially, this may save computing resources (e.g., processor resources, memory resources, communication resources, and/or the like) and that would otherwise have been used by a user to identify, diagnose, and/or remedy errors due to incorrect deployment of vDUs.

As indicated above, FIGS. 1A-1F are provided merely as examples. Other examples can differ from what is described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
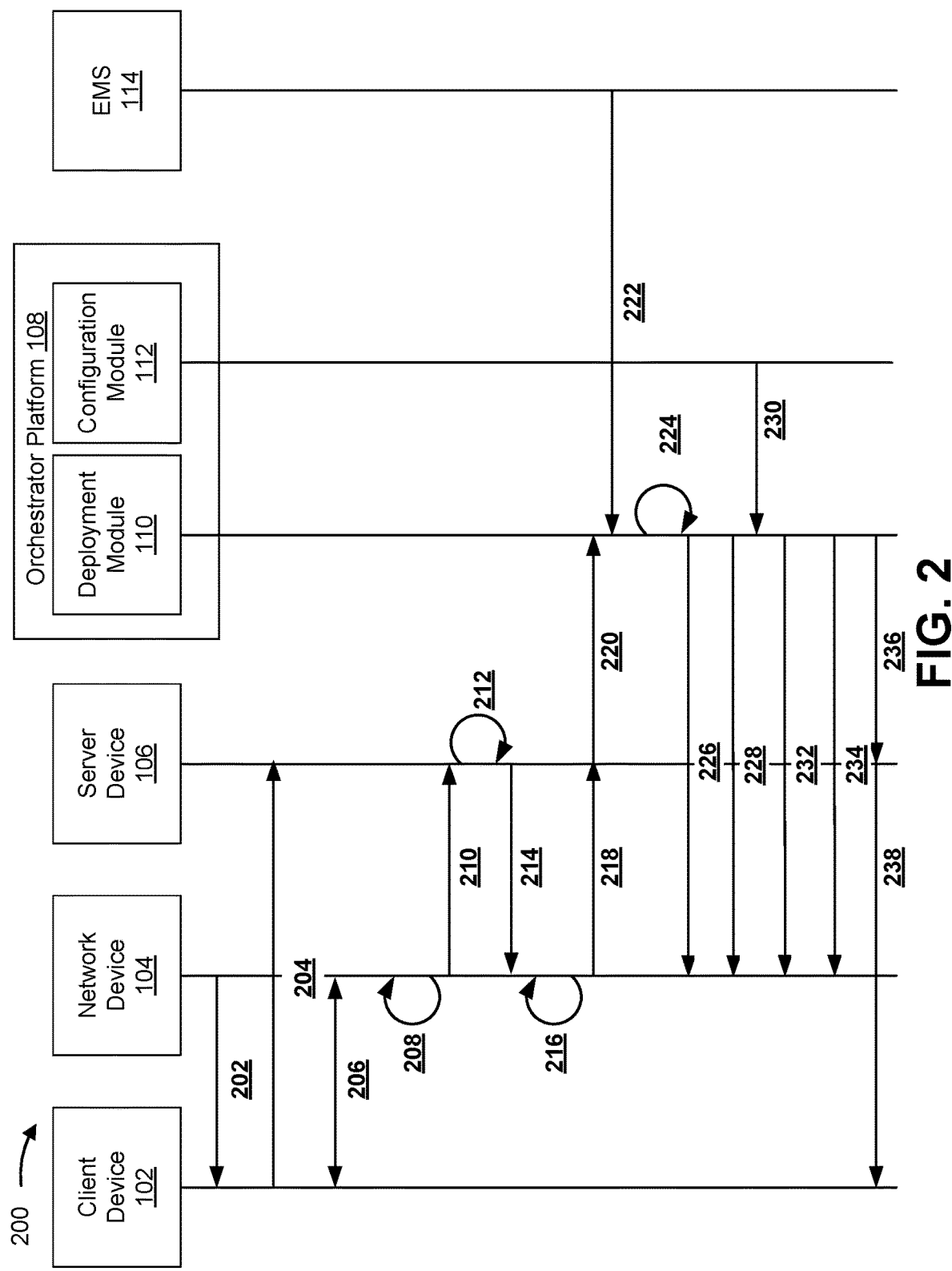
FIG. 2 is a diagram of an example call flow of example operations capable of being performed by one or more devices of FIGS. 1A-1F.

FIG. 2 is a diagram of an example call flow of example operations capable of being performed by one or more devices of FIGS. 1A-1F. As shown in FIG. 2, and by reference number 202, client device 102 may obtain network device information from network device 104. As further shown in FIG. 2, and by reference number 204, the client device 102 may send the network device information to server device 106. As further shown in FIG. 2, and by reference number 206, the client device 102 may establish a connection with the network device 104. As further shown in FIG. 2, and by reference number 208, the network device 104 may obtain an IP address. As further shown in FIG. 2, and by reference number 210, the network device 104 may send registration information to the server device 106. As further shown in FIG. 2, and by reference number 212, the server device 106 may register the network device 104. As further shown in FIG. 2, and by reference number 214, the server device 106 may send at least one initiation instruction to the network device 104. As further shown in FIG. 2, and by reference number 216, the network device 104 may update based on the at least one initiation instruction. As further shown in FIG. 2, and by reference number 218, the network device 104 may send a network device ready message to the server device 106.

As further shown in FIG. 2, and by reference number 220, the server device 106 may send network information associated with the network device 104 to the orchestrator platform 108. As further shown in FIG. 2, and by reference number 222, the configuration module 112 may determine configuration information associated with a vDU to be deployed on the network device 104. As further shown in FIG. 2, and by reference number 224, the orchestrator platform 108 may generate and/or determine deployment information associated with the vDU. As further shown in FIG. 2, and by reference number 226, the orchestrator platform 108 may cause pre-deployment actions to be performed on the network device 104. As further shown in FIG. 2, and by reference number 228, the orchestrator platform 108 may cause a vDU to be deployed on the network device 104. As further shown in FIG. 2, and by reference number 230, the orchestrator platform 108 may obtain additional vDU configuration information from EMS 114. As further shown in FIG. 2, and by reference number 232, the orchestrator platform 108 may cause the vDU to be updated on the network device 104 based on obtaining the additional vDU configuration information. As further shown in FIG. 2, by reference number 234, the orchestrator platform 108 may test deployment of the vDU on the network device 104. As further shown in FIG. 2, and by reference number 236, the orchestrator platform 108 may send a vDU deployment complete message to the server device 106. As further shown in FIG. 2, and by reference number 238, the server device 106 may send a vDU complete message to the network device 104 and/or the client device 102.

Based on the server device 106 sending the vDU complete message to the network device 104 and/or the client device 102, the network device 104 and/or the client device 102 may determine to end installation activities. For example, the client device 102 may display a notification to a user of the client device 102 that the vDU has been successfully deployed and/or that the network device 104 has been successfully set up. This rigorous and automated process for determining deployment information and causing a network device to deploy a vDU may reduce errors associated with previous processes. This, in turn, may save computing resources (e.g., processor resources, memory resources, communication resources, and/or the like) that would otherwise have been sued by a user to identify, diagnose, and/or remedy errors due to incorrect deployment of a vDU.

As indicated above, FIG. 2 is provided merely as an example. Other examples can differ from what is described with regard to FIG. 2.

Figure 3:
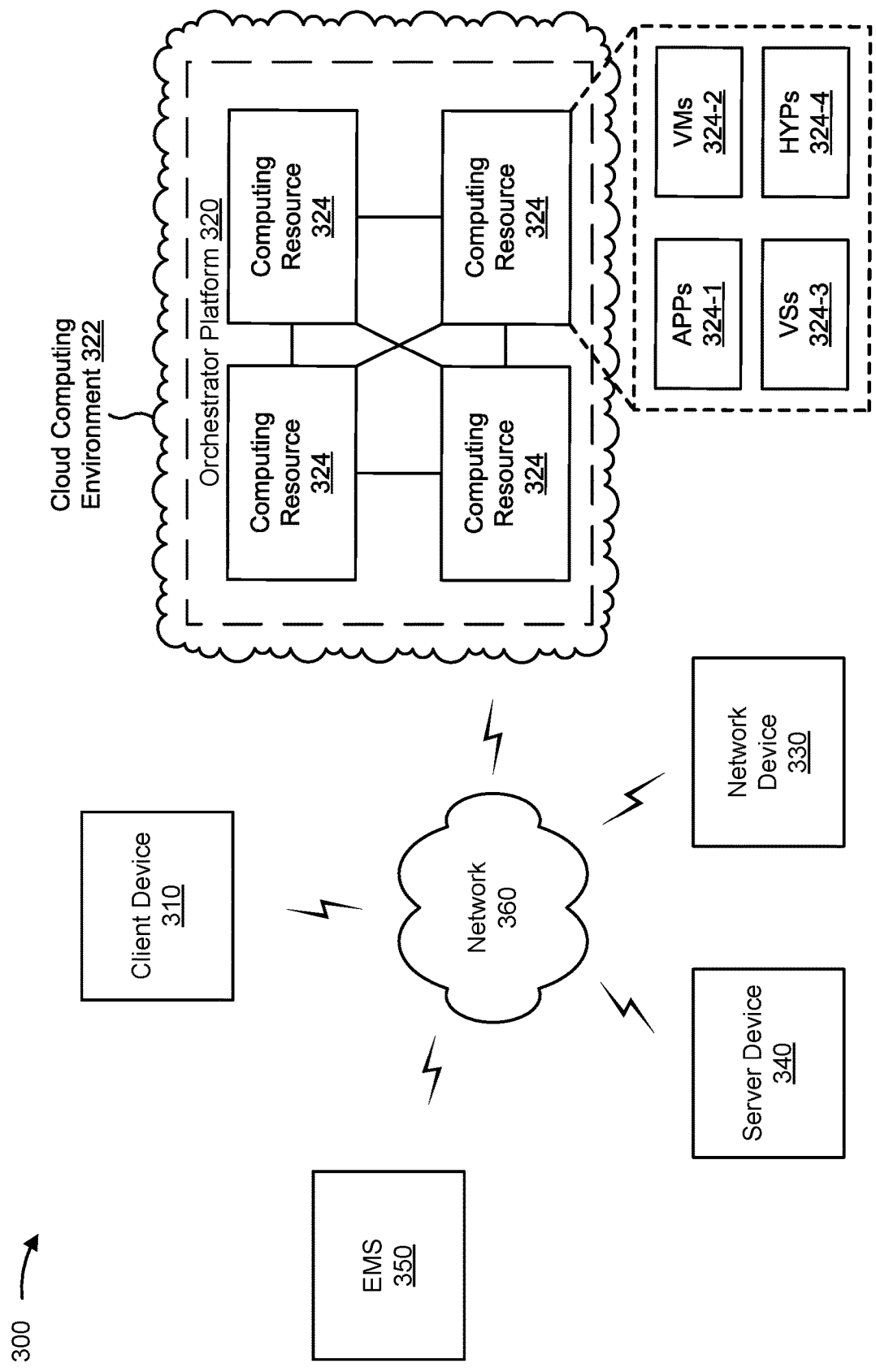
FIG. 3 is a diagram of an example environment in which systems and/or methods described herein may be implemented.

FIG. 3 is a diagram of an example environment 300 in which systems and/or methods, described herein, may be implemented. As shown in FIG. 3, environment 300 may include a client device 310, an orchestrator platform 320, a network device 330, a server device 340, an EMS 350, and/or a network 360. Devices of environment 300 may interconnect via wired connections, wireless connections, or a combination of wired and wireless connections. The devices displayed in FIG. 3 may correspond to one or more devices shown in FIGS. 1A-2. For example, client device 102 may correspond to client device 310, network device 104 may correspond to network device 330, server device 106 may correspond to server device 340, orchestrator platform 108 may correspond to orchestrator platform 320, and/or EMS 114 may correspond to EMS 350.

Client device 310 includes one or more devices capable of receiving, generating, storing, processing, and/or providing information, such as information described herein. For example, client device 310 may include a mobile phone (e.g., a smart phone, a radiotelephone, and/or the like), a laptop computer, a tablet computer, a handheld computer, a gaming device, a wearable communication device (e.g., a smart watch, a pair of smart glasses, a heart rate monitor, a fitness tracker, smart clothing, smart jewelry, a head mounted display, and/or the like), a device included in client device 310 (e.g., a three-axis accelerometer, a global navigation satellite system (GNSS) device, a camera, and/or the like), or a similar type of device. In some implementations, client device 310 may receive information from and/or transmit information to the network device 330, the orchestrator platform 320, and/or the like.

Orchestrator platform 320 includes one or more devices that generate and/or determine deployment information associated with a vDU. In some implementations, orchestrator platform 320 may be designed to be modular such that certain software components may be swapped in or out depending on a particular need. As such, orchestrator platform 320 may be easily and/or quickly reconfigured for different uses. In some implementations, orchestrator platform 320 may receive information from and/or transmit information to one or more client devices 310, network device 330, server device 340, and/or EMS 350.

In some implementations, as shown, orchestrator platform 320 may be hosted in a cloud computing environment 322. Notably, while implementations described herein describe orchestrator platform 320 as being hosted in cloud computing environment 332, in some implementations, orchestrator platform 320 may not be cloud-based (i.e., may be implemented outside of a cloud computing environment) or may be partially cloud-based.

Cloud computing environment 332 includes an environment that hosts orchestrator platform 320. Cloud computing environment 322 may provide computation, software, data access, storage, etc., services that do not require end-user knowledge of a physical location and configuration of system(s) and/or device(s) that hosts orchestrator platform 320. As shown, cloud computing environment 322 may include a group of computing resources 324 (referred to collectively as "computing resources 324" and individually as "computing resource 324").

Computing resource 324 includes one or more personal computers, workstation computers, mainframe devices, or other types of computation and/or communication devices. In some implementations, computing resource 324 may host orchestrator platform 320. The cloud resources may include compute instances executing in computing resource 324, storage devices provided in computing resource 324, data transfer devices provided by computing resource 324, etc. In some implementations, computing resource 324 may communicate with other computing resources 324 via wired connections, wireless connections, or a combination of wired and wireless connections.

As further shown in FIG. 3, computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, and/or the like.

Application 324-1 includes one or more software applications that may be provided to or accessed by client device 310. Application 324-1 may eliminate a need to install and execute the software applications on client device 310. For example, application 324-1 may include software associated with orchestrator platform 320 and/or any other software capable of being provided via cloud computing environment 322. In some implementations, one application 324-1 may send/receive information to/from one or more other applications 324-1, via virtual machine 324-2.

Virtual machine 324-2 includes a software implementation of a machine (e.g., a computer) that executes programs like a physical machine. Virtual machine 324-2 may be either a system virtual machine or a process virtual machine, depending upon use and degree of correspondence to any real machine by virtual machine 324-2. A system virtual machine may provide a complete system platform that supports execution of a complete operating system ("OS"). A process virtual machine may execute a single program and may support a single process. In some implementations, virtual machine 324-2 may execute on behalf of a user (e.g., a user of client device 310 or an operator of orchestrator platform 320), and may manage infrastructure of cloud computing environment 322, such as data management, synchronization, or long-duration data transfers.

Virtualized storage 324-3 includes one or more storage systems and/or one or more devices that use virtualization techniques within the storage systems or devices of computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 324-4 may provide hardware virtualization techniques that allow multiple operating systems (e.g., "guest operating systems") to execute concurrently on a host computer, such as computing resource 324. Hypervisor 324-4 may present a virtual operating platform to the guest operating systems and may manage the execution of the guest operating systems. Multiple instances of a variety of operating systems may share virtualized hardware resources.

Network device 330 includes one or more devices associated with a core network and/or a radio access network (RAN). Network device 330 may be used to host a virtual distributed unit (vDU), as described elsewhere herein. In some implementations, network device 330 may be designed to be modular such that certain software components may be swapped in or out depending on a particular need. As such, network device 330 may be easily and/or quickly reconfigured for different uses. In some implementations, network device 330 may receive information from and/or transmit information to one or more client devices 310, orchestrator platform 320, server device 340, and/or EMS 350.

Server device 340 includes one or more devices capable of receiving, generating, storing, processing, and/or providing information, such as information described herein. For example, server device 340 may include a laptop computer, a tablet computer, a desktop computer, a group of server devices, or a similar type of device. In some implementations, server device 340 may receive information from and/or transmit information to client device 310 and/or orchestrator platform 320.

Element management system (EMS) 350 includes one or more devices, such as one or more computing devices, capable of receiving, generating, storing, processing, and/or providing information that relates to network device 330, as described in further detail elsewhere herein. For example, EMS 350 may provide information for the a vDU deployed on network device 330 to operate with network 360 and transmit the information to network device 330 and/or the orchestrator platform 320. EMS 350 may provision network device 330 according to a node configuration and provide confirmation once network device 330 is successfully provisioned to network 360.

Network 360 includes one or more wired and/or wireless networks. For example, network 360 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
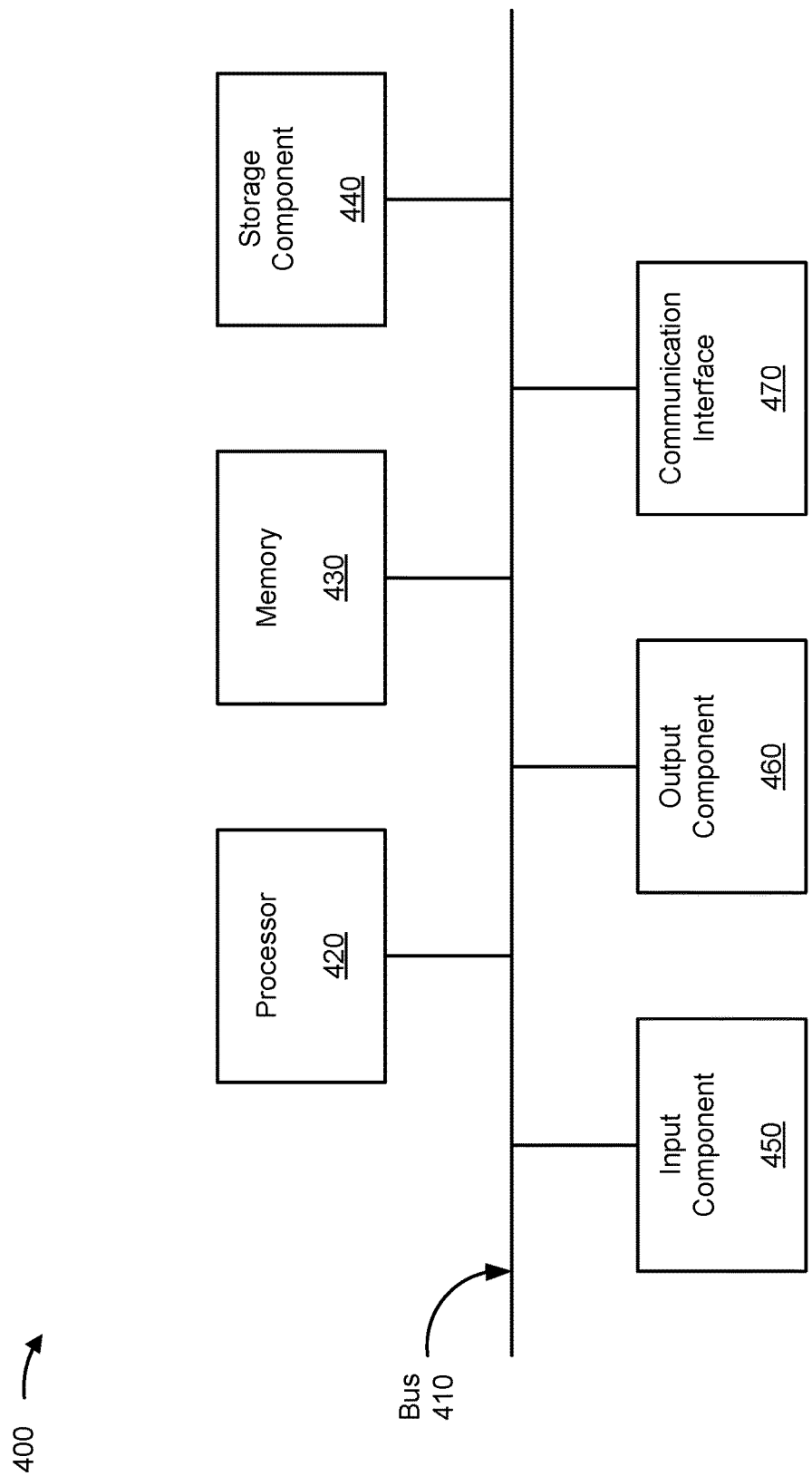
FIG. 4 is a diagram of example components of one or more devices of FIG. 2.

FIG. 4 is a diagram of example components of a device 400. Device 400 may correspond to client device 310, orchestrator platform 320, network device 330, server device 340, and/or EMS 350. In some implementations, client device 310, orchestrator platform 320, network device 330, server device 340, and/or EMS 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for automatically deploying a virtual distributed unit on a network device. In some implementations, one or more process blocks of FIG. 5 may be performed by a device (e.g., orchestrator platform 320). In some implementations, one or more process blocks of FIG. 5 may be performed by another device or a group of devices separate from or including the device, such a client device (e.g., client device 310), an orchestrator platform (e.g., orchestrator platform 320), a network device (e.g., network device 330), a server device (e.g., server device 340), an EMS (e.g., EMS 350), and/or the like.

As shown in FIG. 5, process 500 may include obtaining network information associated with a network device to be installed at a particular location in a network (block 510). For example, the device (e.g., using computing resource 324, processor 420, memory 430, storage component 440, input component 450, output component 460, communication interface 470, and/or the like) may obtain network information associated with a network device to be installed at a particular location in a network, as described above. In some implementations, the network information includes information indicating the particular location in the network. In some implementations, the network information includes at least one of: information indicating the particular location in the network at which the network device is to be installed; information indicating one or more characteristics of the network device; information indicating one or more characteristics of a cluster of network devices that includes the network device; information indicating a market associated with the network device; information indicating a project associated with installing and/or maintaining the network device; or information identifying a particular vendor associated with manufacturing, selling, or maintaining the network device.

As further shown in FIG. 5, process 500 may include selecting, based on the network information, a virtual distributed unit (vDU), of a plurality of vDUs, to be deployed on the network device (block 520). For example, the device (e.g., using computing resource 324, processor 420, memory 430, storage component 440, input component 450, output component 460, communication interface 470, and/or the like) may select, based on the network information, a virtual distributed unit (vDU), of a plurality of vDUs, to be deployed on the network device, as described above.

As further shown in FIG. 5, process 500 may include generating, based on selecting the vDU, deployment information associated with the vDU (block 530). For example, the device (e.g., using computing resource 324, processor 420, memory 430, storage component 440, input component 450, output component 460, communication interface 470, and/or the like) may generate, based on selecting the vDU, deployment information associated with the vDU, as described above. In some implementations, the deployment information includes configuration information that is configured for the particular location. In some implementations, the configuration information that is configured for the particular location includes at least one of: information indicating one or more site-specific parameters associated with the vDU; information indicating storage resources associated with the vDU; information indicating one or more namespaces associated with the vDU; information identifying an element management system (EMS) associated with the vDU; or information indicating an address associated with the vDU.

As further shown in FIG. 5, process 500 may include sending the deployment information to the network device to cause the vDU to be automatically deployed on the network device (block 540). For example, the device (e.g., using computing resource 324, processor 420, memory 430, storage component 440, input component 450, output component 460, communication interface 470, and/or the like) may send the deployment information to the network device to cause the vDU to be automatically deployed on the network device, as described above.

Process 500 may include additional implementations, such as any single implementation or any combination of implementations described below and/or in connection with one or more other processes described elsewhere herein.

In some implementations, process 500 includes processing the network information to identify the information indicating the particular location in the network and information indicating a particular vendor associated with manufacturing, selling, or maintaining the network device; and selecting the vDU based on the information indicating the particular location in the network and the information indicating the particular vendor associated with manufacturing, selling, or maintaining the network device. In some implementations, process 500 includes identifying, based on the information indicating the particular location in the network that is included in the network information, a set of vDUs associated with the particular location in the network; and selecting, based on additional network information included in the network information, the vDU from the set of vDUs.

In some implementations, process 500 includes generating, based on the deployment information associated with the vDU, at least one pre-deployment instruction associated with the vDU; and sending, before sending the deployment information to the network device, the at least one pre-deployment instruction associated with the vDU to the network device to cause the network device to perform at least one pre-deployment action. In some implementations, process 500 includes generating, based on the configuration information included in the deployment information, at least one pre-deployment instruction; and sending, before sending the deployment information to the network device, the at least one pre-deployment instruction to the network device to cause the network device to be configured to allow the vDU to be automatically deployed on the network device. In some implementations, the at least one pre-deployment action includes at least one of: configuring one or more storage resources of the network device; configuring one or more processing resources of the network device; configuring one or more namespaces of the network device; or configuring one or more interfaces of the network device.

In some implementations, process 500 includes obtaining, after sending the deployment information associated with the vDU to the network device, additional configuration information associated with the vDU; generating, based on the additional configuration information associated with the vDU, additional deployment information associated with the vDU; and sending the additional deployment information associated with the vDU to the network device to cause the vDU, deployed on the network device, to be updated. In some implementations, the additional deployment information associated with the vDU includes at least one of: information indicating one or more virtual network functions associated with the vDU; information indicating one or more cells associated with the vDU; information indicating one or more radio parameters associated with the vDU; information indicating one or more handover control parameters associated with the vDU; information indicating at least one cell neighbor associated with the vDU; or information indicating a base station setup associated with the vDU. In some implementations, process 500 includes causing, after sending the deployment information to the network, the vDU to be tested. In some implementations, process 500 includes causing, after sending the deployment information to the network, the vDU to be updated; causing, after causing the vDU to be updated, the vDU to be tested; and sending, after causing the vDU to be tested, a deployment complete notification to a different device associated with installation of the network device at the particular location in the network, where the deployment complete notification is indicating that the vDU has been deployed on the network device, the vDU has been updated, and the vDU has been tested.

In some implementations, process 500 includes generating post-deployment health check data; and sending the post-deployment health check data to the network device to cause the vDU to be tested. In some implementations, process 500 includes determining, after sending the deployment information associated with the vDU to the network device, that the vDU has been successfully deployed on the network device; and sending, based on determining that the vDU has been successfully deployed on the network device, a deployment complete notification to an additional device associated with installation of the network device at the particular location in the network.

In some implementations, process 500 includes sending at least some of the network information to another device to cause the other device to select a particular vDU from a plurality of vDUs; and receiving, after sending the at least some of the network information to the other device, the information identifying the vDU, where the information identifying the vDU concerns the particular vDU. In some implementations, process 500 includes communicating with the network device to test the vDU deployed on the network device; determining, based on communicating with the network device, that the vDU, deployed on the network device, is to be updated; obtaining, based on determining that the vDU is to be updated, additional configuration information associated with the vDU; and causing, based on the additional configuration information associated with the vDU, the vDU, deployed on the network device, to be updated. In some implementations, process 500 includes sending, after sending the deployment information to the network device, a deployment complete notification to at least one other device associated with installation of the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, network information associated with a network device to be installed at a particular location in a network,
      wherein the network information includes information indicating one or more characteristics of a cluster of network devices that includes the network device;
   selecting, by the device and based on the network information, a virtual distributed unit (vDU), of a plurality of vDUs, to be deployed on the network device,
      wherein the vDU meets specifications required by the cluster of network devices, and
      wherein selecting the vDU includes searching a database of information identifying the plurality of vDUs;
   generating, by the device and based on selecting the vDU, deployment information associated with the vDU, wherein the deployment information includes configuration information configured for the particular location; and
   sending, by the device, the deployment information to the network device to cause the vDU to be automatically deployed on the network device.

2. The method of claim 1, wherein the network information includes information indicating at least one of:
   the particular location in the network at which the network device is to be installed;
   one or more characteristics of the network device;
   a market associated with the network device;
   a project associated with installing and/or maintaining the network device; or
   a vendor associated with manufacturing, selling, or maintaining the network device.

3. The method of claim 1, wherein the configuration information that is configured for the particular location includes information indicating at least one of:
   one or more site-specific parameters associated with the vDU;
   storage resources associated with the vDU;
   one or more namespaces associated with the vDU;
   an element management system (EMS) associated with the vDU; or
   an address associated with the vDU.

4. The method of claim 1, further comprising:
   generating, based on the deployment information associated with the vDU, at least one pre-deployment instruction associated with the vDU; and
   sending the at least one pre-deployment instruction associated with the vDU to the network device to cause the network device to perform at least one pre-deployment action.

5. The method of claim 4, wherein the at least one pre-deployment action includes at least one of configuring one or more:
   storage resources of the network device;
   processing resources of the network device;
   namespaces of the network device; or
   interfaces of the network device.

6. The method of claim 1, further comprising:
   obtaining, after sending the deployment information associated with the vDU to the network device, additional configuration information associated with the vDU;
   generating, based on the additional configuration information associated with the vDU, additional deployment information associated with the vDU; and
   sending the additional deployment information associated with the vDU to the network device to cause the vDU, deployed on the network device, to be updated.

7. The method of claim 6, wherein the additional deployment information associated with the vDU includes information indicating at least one of:
   one or more virtual network functions associated with the vDU;
   one or more cells associated with the vDU;
   one or more radio parameters associated with the vDU;
   one or more handover control parameters associated with the vDU;
   at least one cell neighbor associated with the vDU; or
   a base station setup associated with the vDU.

8. The method of claim 1, further comprising:
generating post-deployment health check data; and
sending the post-deployment health check data to the network device to cause the vDU to be tested.

9. The method of claim 1, further comprising:
determining, after sending the deployment information associated with the vDU to the network device, that the vDU has been successfully deployed on the network device; and
sending, based on determining that the vDU has been successfully deployed on the network device, a deployment complete notification to an additional device associated with installation of the network device at the particular location in the network.

10. A device, comprising:
one or more processors configured to:
obtain network information associated with a network device to be installed at a particular location in a network,
wherein the network information includes information indicating the particular location in the network, and
wherein the network information includes information indicating one or more characteristics of a cluster of network devices that includes the network device;
select, based on the information indicating the particular location in the network, a virtual distributed unit (vDU), of a plurality of vDUs, to be deployed on the network device,
wherein the vDU meets specifications required by the cluster of network devices, and
wherein the one or more processors, when selecting the vDU, are to search a database of information identifying the plurality of vDUs;
generate, by the device and based on selecting the vDU, deployment information associated with the vDU, wherein the deployment information includes configuration information that is configured for the particular location; and
send the deployment information to the network device to cause the vDU to be automatically deployed on the network device.

11. The device of claim 10, wherein the one or more processors, when selecting the vDU to be deployed on the network device, are configured to:
process the network information to identify the information indicating the particular location in the network and information indicating a particular vendor associated with manufacturing, selling, or maintaining the network device; and
select the vDU based on the information indicating the particular location in the network and the information indicating the particular vendor associated with manufacturing, selling, or maintaining the network device.

12. The device of claim 10, wherein the one or more processors, when selecting the vDU to be deployed on the network device, are configured to:
identify, based on the information indicating the particular location in the network that is included in the network information, a set of vDUs associated with the particular location in the network; and
select, based on additional network information included in the network information, the vDU from the set of vDUs.

13. The device of claim 10, wherein the one or more processors are further configured to:
generate, based on the configuration information included in the deployment information, at least one pre-deployment instruction; and
send, the at least one pre-deployment instruction to the network device to cause the network device to be configured to allow the vDU to be automatically deployed on the network device.

14. The device of claim 10, wherein the one or more processors are further configured to:
obtain, after sending the deployment information to the network device, additional configuration information associated with the vDU; and
cause, based on the additional configuration information associated with the vDU, the vDU, deployed on the network device, to be updated.

15. The device of claim 10, wherein the one or more processors are further configured to:
cause, after sending the deployment information to the network, the vDU to be tested.

16. The device of claim 10, wherein the one or more processors are further configured to:
cause, after sending the deployment information to the network, the vDU to be updated;
cause, after causing the vDU to be updated, the vDU to be tested; and
send, after causing the vDU to be tested, a deployment complete notification to a different device associated with installation of the network device at the particular location in the network,
wherein the deployment complete notification indicates that the vDU has been deployed on the network device, the vDU has been updated, and the vDU has been tested.

17. A non-transitory computer-readable medium storing instructions, the instructions comprising:
one or more instructions that, when executed by one or more processors of a device, cause the device to:
obtain network information associated with a network device to be installed at a particular location in a network,
wherein the network information includes information indicating one or more characteristics of a cluster of network devices that includes the network device;
obtain, based on the network information, information identifying a virtual distributed unit (vDU), of a plurality of vDUs, to be deployed on the network device,
wherein the vDU meets specifications required by the cluster of network devices, and
wherein the one or more instructions, that cause the one or more processors to select the vDU, cause the one or more processors to search a database of information identifying the plurality of vDUs;
generate, by the device and based on the information identifying the vDU, deployment information associated with the vDU, wherein the deployment information includes configuration information that is configured for the particular location; and
send the deployment information to the network device to cause the vDU to be automatically deployed on the network device.

18. The non-transitory computer-readable medium of claim 17, wherein the one or more instructions, that cause the device to obtain the information identifying the vDU to be deployed on the network device, cause the device to:

send at least some of the network information to another device to cause the other device to select a particular vDU from a plurality of vDUs; and receive, after sending the at least some of the network information to the other device, the information identifying the vDU,
wherein the information identifying the vDU concerns the particular vDU.

19. The non-transitory computer-readable medium of claim 18, wherein the one or more instructions, when executed by the device, further cause the device to:

communicate with the network device to test the vDU deployed on the network device;

determine, based on communicating with the network device, that the vDU, deployed on the network device, is to be updated;

obtain, based on determining that the vDU is to be updated, additional configuration information associated with the vDU; and cause, based on the additional configuration information associated with the vDU, the vDU, deployed on the network device, to be updated.

20. The non-transitory computer-readable medium of claim 17, wherein the one or more instructions, when executed by the one or more processors, further cause the device to:

send, after sending the deployment information to the network device, a deployment complete notification to at least one other device associated with installation of the network device.

* * * * *